(12) United States Patent
Kanagai et al.

(10) Patent No.: US 9,090,291 B1
(45) Date of Patent: Jul. 28, 2015

(54) FRONT PILLAR ASSEMBLIES WITH FRONT PILLAR LOWER REINFORCEMENT MEMBERS HAVING LOWER WRAP REINFORCEMENT STRUCTURES

(71) Applicant: Toyota Motor Engineering & Manufacturing North America, Inc., Erlanger, KY (US)

(72) Inventors: Shunsuke Kanagai, Novi, MI (US); Corinne Uskali, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/242,169

(22) Filed: Apr. 1, 2014

(51) Int. Cl.
  *B60J 7/00* (2006.01)
  *B62D 25/04* (2006.01)
  *B62D 25/02* (2006.01)

(52) U.S. Cl.
  CPC .............. *B62D 25/04* (2013.01); *B62D 25/025* (2013.01)

(58) Field of Classification Search
  CPC .... B62D 25/20; B62D 25/04; B62D 25/2036; B62D 25/025
  USPC ............. 296/203.03, 187.12, 203.04, 193.06, 296/209, 193.05, 29
  See application file for complete search history.

(56) References Cited

U.S. PATENT DOCUMENTS

| | | | |
|---|---|---|---|
| 4,550,948 A * | 11/1985 | Hamada et al. | 296/202 |
| 5,820,204 A * | 10/1998 | Masuda et al. | 296/187.12 |
| 6,447,052 B2 * | 9/2002 | Saeki | 296/187.09 |
| 6,679,547 B2 | 1/2004 | Ju Sik | |
| 7,264,302 B2 * | 9/2007 | Nagashima | 296/187.12 |
| 8,002,337 B2 | 8/2011 | Baccouche et al. | |
| 8,282,154 B2 * | 10/2012 | Maruyama | 296/193.05 |
| 8,371,643 B2 | 2/2013 | Itakura | |
| 8,439,428 B2 * | 5/2013 | Imamura | 296/193.05 |
| 8,439,429 B2 * | 5/2013 | Shida et al. | 296/193.06 |
| 8,662,575 B2 * | 3/2014 | Tamura | 296/209 |

(Continued)

FOREIGN PATENT DOCUMENTS

| | | |
|---|---|---|
| JP | 2008239026 | 10/2008 |
| JP | 2009101794 | 5/2009 |
| WO | WO2013077084 | 5/2013 |

*Primary Examiner* — Pinel Romain
(74) *Attorney, Agent, or Firm* — Dinsmore & Shohl LLP

(57) ABSTRACT

A vehicle including a lower reinforcement assembly for a front pillar assembly includes a rocker outer reinforcement member that extends in a vehicle lengthwise direction and includes a vertically oriented face. An upper portion extends inwardly from the face in a vehicle widthwise direction and a lower portion extends inwardly from the face in the vehicle widthwise direction thereby defining a vehicle lengthwise extending cavity. A front pillar lower reinforcement member is connected to the rocker outer reinforcement member. The front pillar lower reinforcement member includes an upwardly extending pillar portion and a lengthwise extending rocker portion having a vertically oriented face that extends downwardly terminating at the face of the outer reinforcement member at a lower edge that extends in the vehicle lengthwise direction. The front pillar lower reinforcement member includes a lower wrap reinforcement structure that extends downwardly beyond the lower edge and inwardly in the vehicle widthwise direction over a corner of the rocker outer reinforcement member. The corner connects the face of the rocker outer reinforcement member and the lower portion of the rocker outer reinforcement member.

20 Claims, 5 Drawing Sheets

(56) References Cited

U.S. PATENT DOCUMENTS

| | | | |
|---|---|---|---|
| 8,678,481 B2* | 3/2014 | Tamura | 296/193.05 |
| 2006/0158008 A1* | 7/2006 | Nagashima | 296/203.03 |
| 2009/0261622 A1* | 10/2009 | Rill et al. | 296/209 |
| 2011/0233970 A1* | 9/2011 | Nagai et al. | 296/203.03 |
| 2012/0098297 A1* | 4/2012 | Kurokawa | 296/193.06 |
| 2013/0264840 A1* | 10/2013 | Izumi et al. | 296/187.12 |
| 2014/0159427 A1* | 6/2014 | Kim et al. | 296/193.06 |
| 2014/0333093 A1* | 11/2014 | Matsuura et al. | 296/187.12 |

* cited by examiner

FRONT PILLAR ASSEMBLIES WITH FRONT PILLAR LOWER REINFORCEMENT MEMBERS HAVING LOWER WRAP REINFORCEMENT STRUCTURES

TECHNICAL FIELD

The present specification generally relates to front pillar assemblies in vehicles and, more particularly, to a front pillar assembly with a front pillar lower reinforcement member having a lower wrap reinforcement structure.

BACKGROUND

Vehicles typically use various frame structures, such as reinforcements, to provide vehicle stiffness. For example, front pillar assemblies can provide structural support for a roof of the vehicle as well as transfer a force from a frontal impact to other vehicle structures. Reinforcement structures may be used to reduce deformation of the vehicle. Which structures reduce deformation of the vehicle during an impact can depend on the type and direction of impact. For example, for a frontal impact, different vehicle structures may be implicated depending on the location and direction of the frontal impact. Two types of frontal offset impacts include a moderate overlap frontal crash and a small overlap frontal crash. While moderate overlap frontal crashes affect a relatively moderate number of vehicle reinforcement structures and collision mechanisms, small overlap frontal crashes affect outer edges of the vehicle.

SUMMARY

In one embodiment, a vehicle including a lower reinforcement assembly for a front pillar assembly includes a rocker outer reinforcement member that extends in a vehicle lengthwise direction and includes a vertically oriented face. An upper portion extends inwardly from the face in a vehicle widthwise direction and a lower portion extends inwardly from the face in the vehicle widthwise direction thereby defining a vehicle lengthwise extending cavity. A front pillar lower reinforcement member is connected to the rocker outer reinforcement member. The front pillar lower reinforcement member includes an upwardly extending pillar portion and a lengthwise extending rocker portion having a vertically oriented face that extends downwardly terminating at the face of the outer reinforcement member at a lower edge that extends in the vehicle lengthwise direction. The front pillar lower reinforcement member includes a lower wrap reinforcement structure that extends downwardly beyond the lower edge and inwardly in the vehicle widthwise direction over a corner of the rocker outer reinforcement member. The corner connects the face of the rocker outer reinforcement member and the lower portion of the rocker outer reinforcement member.

In another embodiment, a front pillar lower reinforcement member includes a pillar portion and a rocker portion having a face that terminates at a lower edge extending along a length of the rocker portion. A lower wrap reinforcement structure has a downwardly extending portion that is arranged and configured to extend outwardly beyond the lower edge along a face of a rocker outer reinforcement member and an inwardly extending portion that is arranged and configured to extend over a corner that connects the face of the rocker outer reinforcement member and an inwardly extending lower portion of the rocker outer reinforcement member.

In another embodiment, a lower reinforcement assembly for a front pillar assembly of a vehicle includes a rocker outer reinforcement member that extends in a vehicle lengthwise direction and includes a vertically oriented face. An upper portion extends inwardly from the face in a vehicle widthwise direction and a lower portion extends inwardly from the face in the vehicle widthwise direction thereby defining a vehicle lengthwise extending cavity. A front pillar lower reinforcement member includes an upwardly extending pillar portion and a lengthwise extending rocker portion having a face that terminates at a lower edge extending along a length of the rocker portion. A lower wrap reinforcement structure has a downwardly extending portion that extends downwardly beyond the lower edge along a face of the rocker outer reinforcement member and an inwardly extending portion that extends along the lower portion of the rocker outer reinforcement member at an angle to the downwardly extending portion.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein generally relate to front pillar assemblies with a front pillar lower reinforcement members having lower wrap reinforcement structures. The front pillar lower reinforcement members include a pillar portion and a rocker portion. The pillar portion extends generally in an up and down direction and rocker portion extends generally in a vehicle lengthwise direction along a rocker assembly forming a somewhat L-shape. The front pillar lower reinforcement member includes a lower wrap reinforcement structure that extends downwardly along the rocker assembly and inwardly along the rocker assembly in a vehicle widthwise direction thereby wrapping at least a portion of the rocker assembly. The lower wrap reinforcement structure may be of limited extent along an entire length of the rocker reinforcement portion of the front pillar lower reinforcement member. While the driver's side structures may be discussed below, the passenger's side structures may include similar or the same body structures. Accordingly, the driver's side structure is discussed herein.

Figure 1:
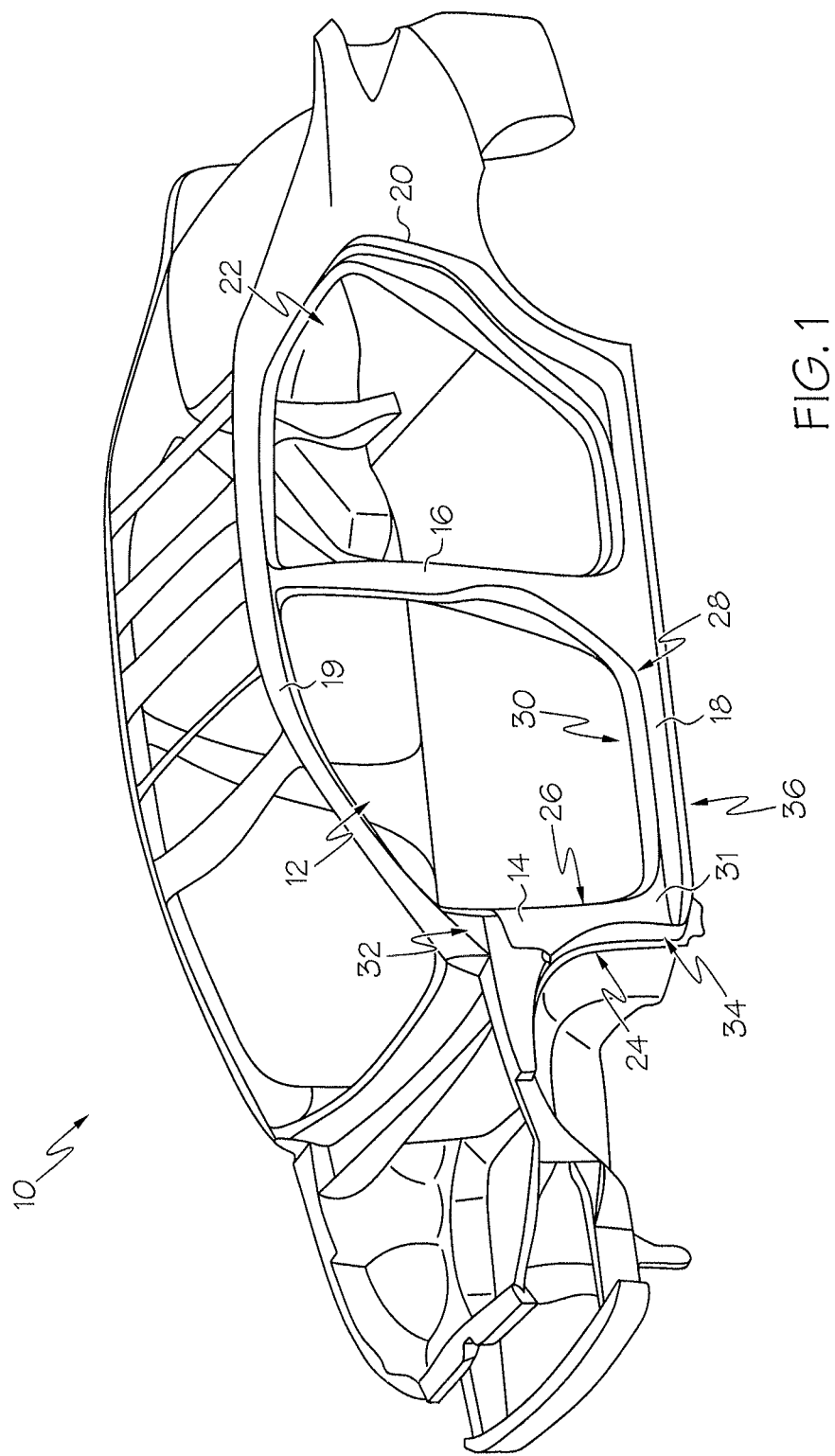
FIG. 1 is an exemplary perspective view of a vehicle body according to one or more embodiments described herein.

Referring to FIG. 1, a vehicle body 10 has a door opening 12 with a front edge of the door opening 12 being defined by a front pillar 14 (sometimes referred to as an A-pillar), a rearward edge of the door opening 12 being defined by a center pillar 16 (sometimes referred to as a B-pillar) and a lower edge of the door opening 12 being defined by a rocker assembly 18. An upper edge of the door opening 12 may be defined by a roof side rail 19. As used herein, the forward traveling direction of a vehicle may be referred to as "front," the rearward travelling direction may be referred to as "rear," the vertical upward direction may be referred to as "upper," the vertical downward direction may be referred to as "lower" and directions along the width of the vehicle may be referred to as "outward" and "inward." A rear pillar 20 (sometimes referred to as a C-pillar) may also be provided to define another door opening 22 between the rear pillar 20 and the center pillar 16. The vehicle body 10 may include more or less pillars than the illustrated front pillar 14, center pillar 16 and rear pillar 20, such as a D-pillar.

Figure 4:
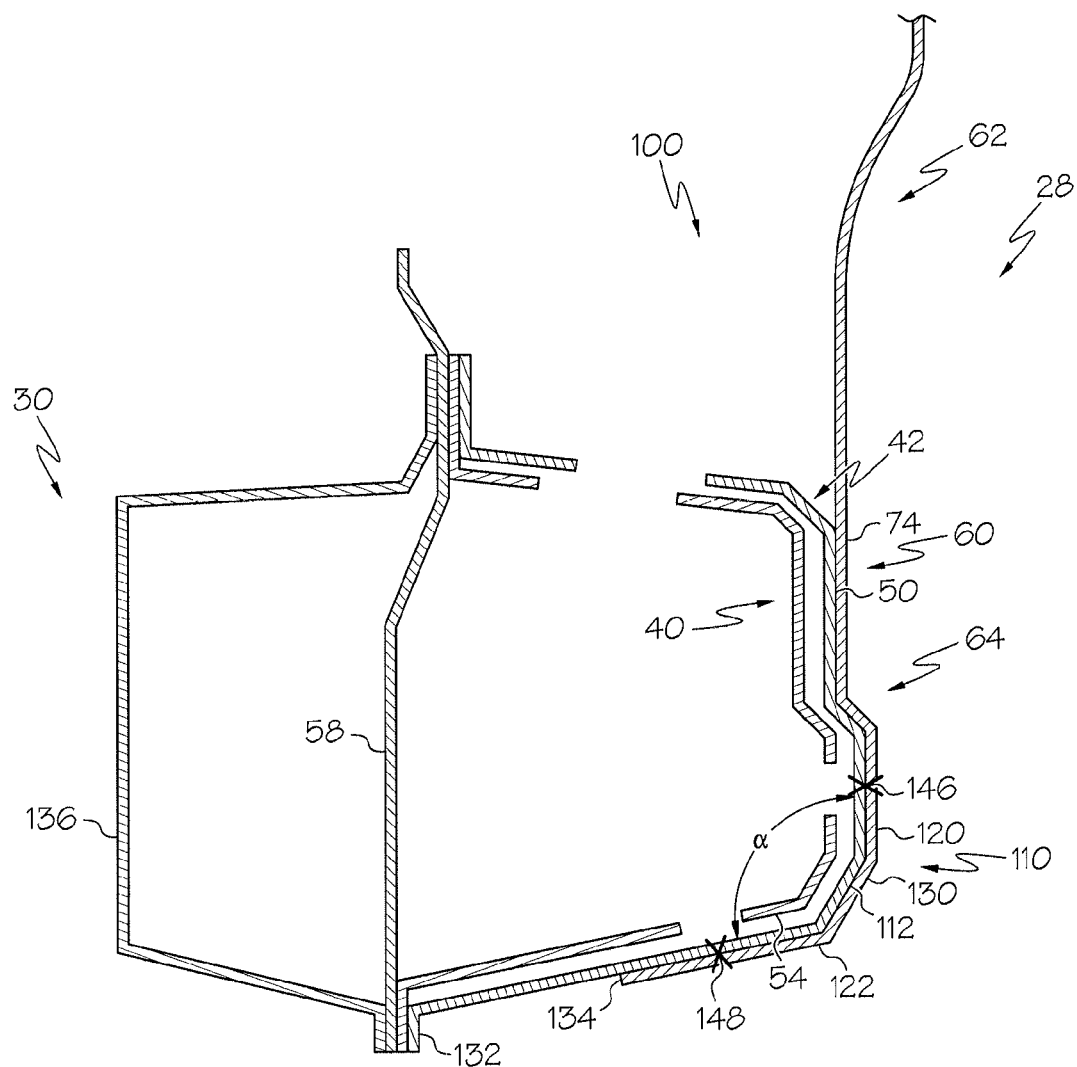
FIG. 4 is a simplified, section view along line 4-4 of FIG. 3 according to one or more embodiments described herein.

Generally, the front pillar 14 may include an outer panel assembly 24 and an inner panel assembly 26. Similarly, the rocker assembly 18 may include an outer panel assembly 28 and an inner panel assembly 30 (see, for example, FIG. 4). The outer panel assembly 24 and inner panel assembly 26 of the front pillar 14 may be welded or otherwise joined together to form a somewhat enclosed structure. The outer panel assembly 28 and the inner panel assembly 30 may also be welded or otherwise joined to form a somewhat enclosed structure, as can be seen by FIG. 4. The vehicle body 10 includes a side body outer panel 31 that forms the general outer shape of the vertically extending front pillar 14 and lengthwise extending rocker assembly 18. The vehicle body 10 may have an upper front pillar region 32, a lower front pillar region 34 and a rocker assembly region 36 that is connected to the lower front pillar region 34 forming a somewhat L-shape. Because the lower front pillar region 34 and rocker assembly region 36 of the vehicle body 10 are primarily described below, components of other regions may be omitted for clarity.

Figure 2:
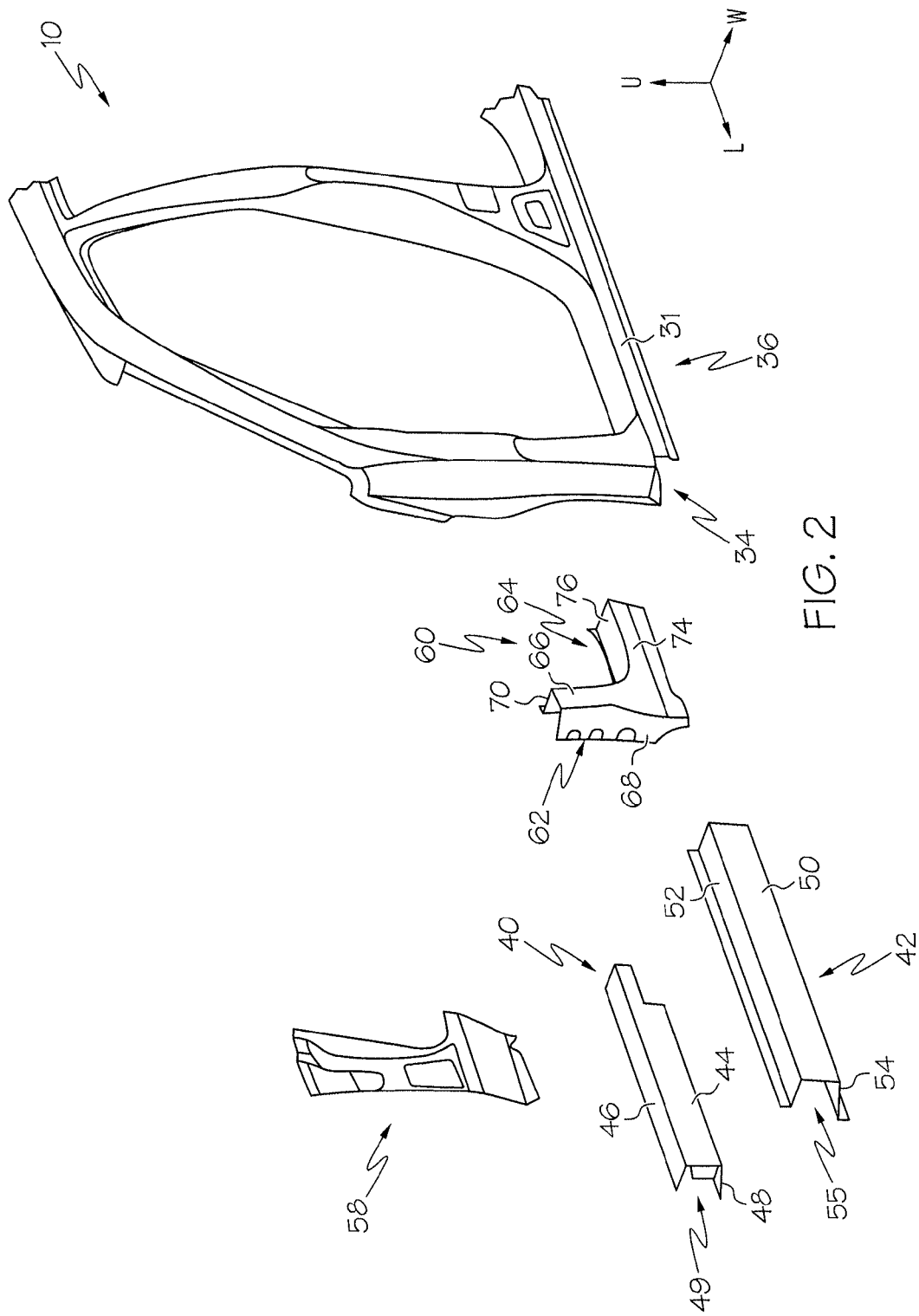
FIG. 2 is a simplified, exploded view of a lower front outer pillar region and rocker outer assembly region of the vehicle body of FIG. 1 according to one or more embodiments described herein.

Referring to FIG. 2, an exploded view of the lower front pillar region 34 and rocker assembly region 36 of the vehicle body 10 is illustrated. The rocker assembly region 36 includes a rocker inner reinforcement member 40 and a rocker outer reinforcement member 42. The rocker inner reinforcement member 40 extends generally in the vehicle lengthwise direction and is sized to be received within the rocker outer reinforcement member 42, which also extends generally in the vehicle lengthwise direction. The rocker inner reinforcement member 40 includes a generally vertically oriented face 44, an upper portion 46 extending inwardly from the top of the face 44 in the vehicle widthwise direction and a lower portion 48 extending inwardly from the bottom of the face 44 in the vehicle widthwise direction, forming somewhat of a U-shape cross-section and a vehicle lengthwise extending cavity 49. Similarly, the rocker outer reinforcement member 42 includes a generally vertically oriented face 50, an upper portion 52 extending inwardly from the top of the face 50 in the vehicle widthwise direction and a lower portion 54 extending inwardly from the bottom of the face 50 in the vehicle widthwise direction, forming somewhat of a U-shape cross-section and a vehicle lengthwise extending cavity 55. The rocker inner reinforcement member 40 may be connected to the rocker outer reinforcement member 42 in any suitable fashion, such as spot welding to join any one or more of their faces 44 and 50, upper portions 46 and 52 and lower portions 48 and 54. In some embodiments, the rocker inner reinforcement member 40 and rocker outer reinforcement member 42 may be connected together via connections with a front pillar inner lower member 58, e.g., by spot welding, bolting, structural adhesive, etc. The rocker inner reinforcement member 40, rocker outer reinforcement member 42 and front pillar inner lower reinforcement member 58 may be formed of the same or of different materials, such as aluminum and steel and formed by any suitable method, such as extrusion, drawing, stamping and/or machining.

The lower front pillar region 34 includes a front pillar lower reinforcement member 60. The front pillar lower reinforcement member 60 includes a generally vertical or upwardly extending pillar portion 62 and a generally horizontal or lengthwise extending rocker portion 64 forming somewhat of an L-shape. The pillar portion 62 includes a generally vertically oriented face 66, a front portion 68 extending inwardly from the face 66 in the vehicle widthwise direction and a rear portion 70 extending inwardly from the face 66 in the vehicle widthwise direction, forming somewhat of a U-shape cross-section. The rocker portion 64 includes a generally vertically oriented face 74 and an upper portion 76 extending inwardly from a top of the face 74 in the vehicle widthwise direction. In some embodiments, the front pillar lower reinforcement member 60 may be connected to the rocker outer reinforcement member 42 and side body outer panel 31, e.g., by spot welding, bolting, structural adhesive, etc. The front pillar lower reinforcement member 60 may be formed of any suitable materials, such as aluminum and steel and formed by any suitable method, such as extrusion, drawing, stamping and/or machining.

Figure 3:
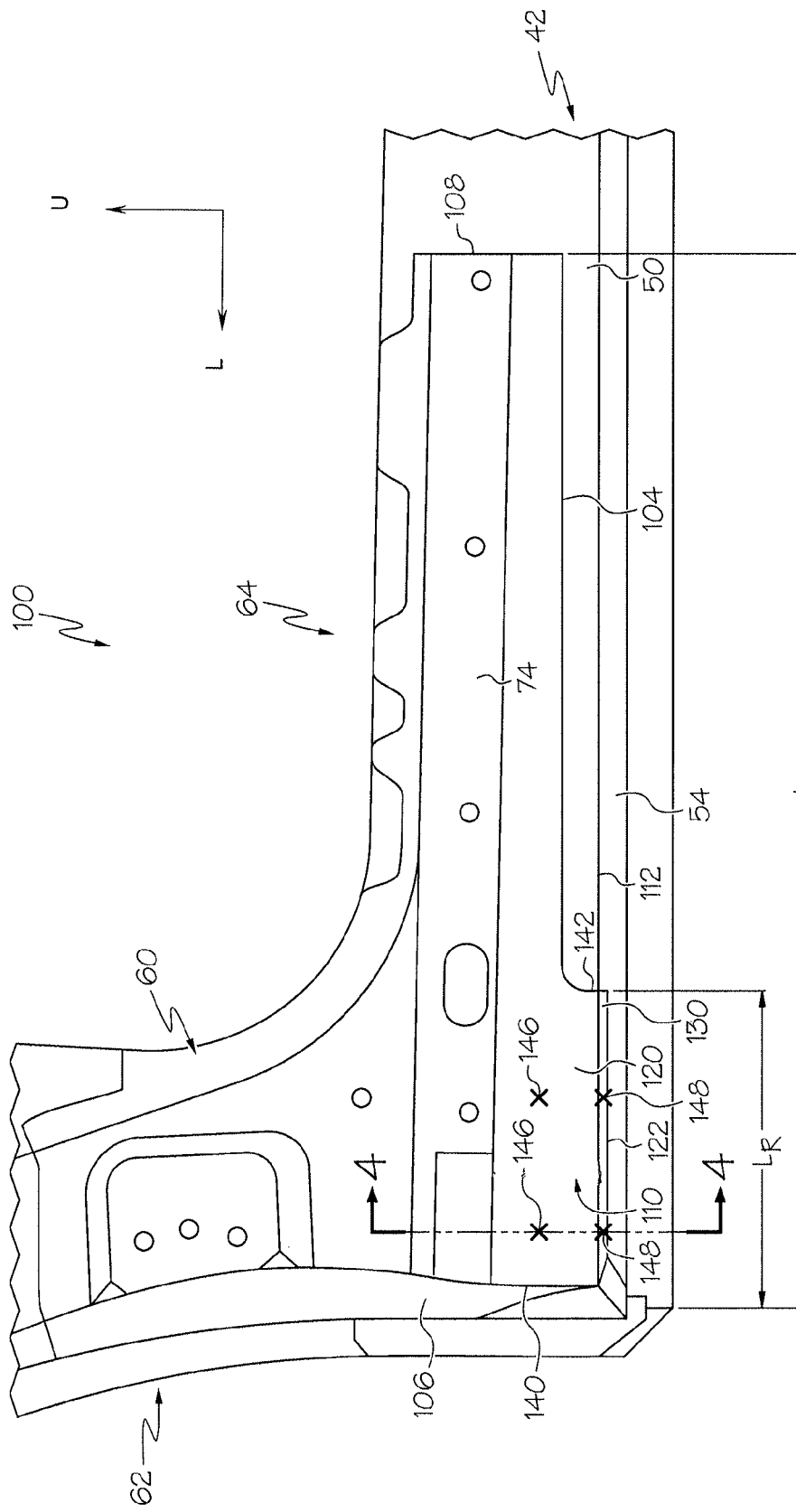
FIG. 3 is a simplified side view of a lower reinforcement assembly according to one or more embodiments described herein.

Referring to FIG. 3, a lower reinforcement assembly 100 without the side body outer panel 31 includes the front pillar lower reinforcement member 60 and the rocker outer reinforcement member 42 connected together. Referring also to FIG. 4, the rocker inner reinforcement member 40 may be received within the rocker outer reinforcement member 42. The front pillar lower reinforcement member 60 includes the upwardly extending pillar portion 62 and the lengthwise extending rocker portion 64. The face 74 of the rocker portion 64 extends generally in the vehicle lengthwise and vertical direction downwardly to a lower edge 104 that extends a majority of a total length $L_T$ at the bottom of the rocker portion 64 measured from a front facing terminal end 106 to a rear facing terminal end 108 of the rocker portion 64 (FIG. 3).

A lower wrap reinforcement structure 110 extends downwardly beyond the lower edge 104 of the face 74. The lower wrap reinforcement structure 110 can extend downwardly along the face 50 of the rocker outer reinforcement member 42 and over a corner 112 that connects the face 50 and inwardly extending lower portion 54 of the rocker outer reinforcement member 42 (FIG. 4). In this manner, the lower wrap reinforcement structure 110 may include a generally vertical or downwardly extending portion 120 and a generally widthwise or inwardly extending portion 122 extending at an angle α (e.g., between about 90 degrees and about 170 degrees) to the downwardly extending portion 120. As can be seen by FIG. 4, the lower wrap reinforcement structure 110 extends or is wrapped around the corner 112, also forming a corner 130 in the lower wrap reinforcement structure 110. The inwardly extending portion 122 of the lower wrap reinforcement structure 110 terminates at an end 134. The end 134 may be located between and spaced from the corner 112 and a lower flange 132 of the rocker outer reinforcement member 42 that extends generally downward from the inwardly extending portion 122 and connects to the front pillar inner lower reinforcement member 58 and one or more rocker inner panels 136 (e.g., by welds).

Referring again to FIG. 3, the lower wrap reinforcement structure 110 is of limited extent in the vehicle lengthwise direction along the total length $L_T$ of the rocker portion 64. Without wishing to be bound by theory, during a front small overlap collision event, the side body outer panel 31 (FIG. 1) that forms the general outer shape of the front pillar 14 and rocker assembly 18 may tend to shear away from the rocker outer reinforcement member 42 at a location between the front pillar 14 and rocker assembly 18, or with reference to FIG. 3, at a location between the pillar portion 62 and the rocker portion 64 or the front pillar reinforcement member 60. In some embodiments, a length $L_R$ of the lower wrap reinforcement structure 110 measured between edges 140 and 142 of the lower wrap reinforcement structure 110 may be selected to extend from or near the front facing terminal end 106, while wrapping around the rocker outer reinforcement member 42, as described above. In some embodiments, the length $L_R$ of the lower wrap reinforcement structure 110 may be at least about 50 mm, such as at least about 75 mm, such as at least about 100 mm. In some embodiments, the length $L_R$ may be no greater than about 200 mm, such as no greater than about 150 mm, such as between about 50 mm and 200 mm, such as between about 75 mm and 150 mm. In some embodiments, length $L_R$ may be about 50 percent or less of a length $L_T$, such as between about 25 percent and about 50 percent.

The front pillar lower reinforcement member 60 may be connected directly to the rocker outer reinforcement member 42 using, at least in part, the lower wrap reinforcement structure 110. Referring particularly to FIG. 4, in some embodiments, the downwardly extending portion 120 and/or the inwardly extending portion 122 of the lower wrap reinforcement structure 110 may be welded (e.g., spot welded) to the rocker outer reinforcement member 42 by welds 146 and 148. In some embodiments, the length $L_R$ of the lower wrap reinforcement structure 110 may be selected to allow for multiple welds (e.g., two or more) to be provided in the downwardly extending portion 120 and the inwardly extending portion 122, spaced-apart in the vehicle lengthwise direction, connecting the lower wrap reinforcement structure 110 to the rocker outer reinforcement member 42, as shown by FIG. 3.

Figure 5:
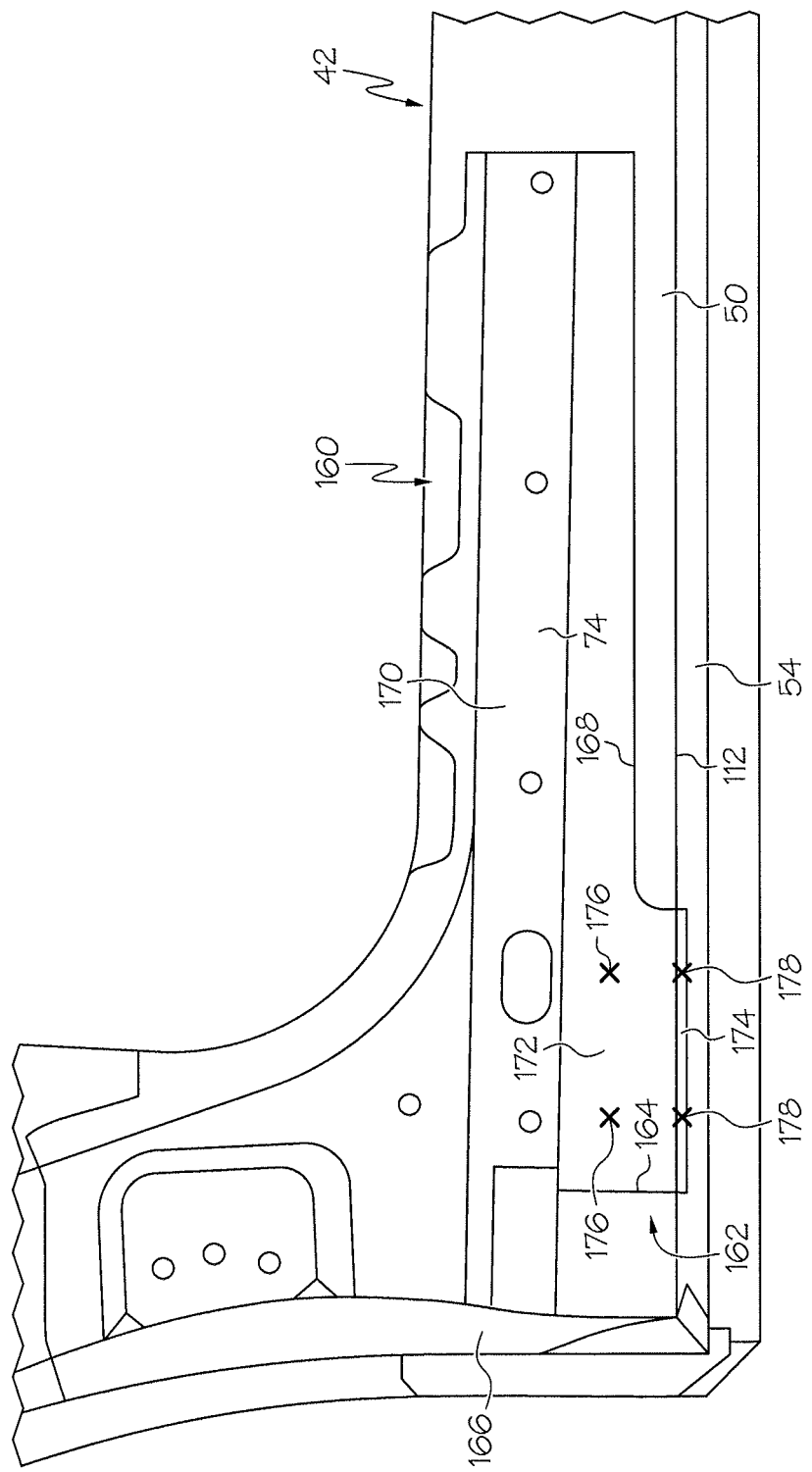
FIG. 5 illustrates a simplified view of another lower reinforcement assembly including another embodiment of a front pillar reinforcement member according to one or more embodiments described herein.

Referring to FIG. 5, another embodiment of a front pillar lower reinforcement member 160 includes a lower wrap reinforcement structure 162 having a forward located edge 164 that is spaced from a front facing terminal end 166 of the front pillar lower reinforcement member 160. The lower wrap reinforcement structure 162 extends downwardly beyond a lower edge 168 of face 170. The lower wrap reinforcement structure 162 can extend downwardly along the face 50 of the rocker outer reinforcement member 42 and over a corner 112 that connects the face 50 and inwardly extending lower portion 54 of the rocker outer reinforcement member 42. The lower wrap reinforcement structure 162 may include a generally vertical or downwardly extending portion 172 and a generally widthwise or inwardly extending portion 174 extending at an angle α to the downwardly extending portion 172. Further, the downwardly extending portion 172 and the inwardly extending portion 174 of the lower wrap reinforcement structure 162 may be welded (e.g., spot welded) to the rocker outer reinforcement member 42 by welds 176 and 178. In some embodiments, multiple welds (e.g., two or more) may be provided in the downwardly extending portion 172 and the inwardly extending portion 174, spaced-apart in the vehicle lengthwise direction, connecting the lower wrap reinforcement structure 162 to the rocker outer reinforcement member 42.

The above-described front pillar assemblies include front pillar lower reinforcements having lower wrap reinforcement structures that can provide additional reinforcement and inhibit or reduce shearing of components of the front pillar assemblies, such as side body outer panels. The lower wrap reinforcement structures can be an integral part of the front pillar lower reinforcements and can include a downwardly extending portion and an inwardly extending portion that are welded directly to the rocker outer reinforcement member, for example, by spot welds. In some embodiments, the downwardly extending portion and the inwardly extending portion may be welded to the rocker outer reinforcement member at multiple locations that are spaced apart from each other in the vehicle lengthwise direction. Additionally, the lower wrap reinforcement structure may be of limited extent in the vehicle lengthwise direction along the total length of the rocker portion of the front pillar reinforcement member. For example, the lower wrap reinforcement member may extend no more than about 50 percent of the total length of the rocker portion.

Directional terms used herein—for example widthwise, lengthwise, vertical, up, down, right, left, front, back, top, bottom, upper, lower—are made only to supply directional context. For example, the terms "extending vertically" or "extending generally vertically" are not meant to exclude a vertically and horizontally extending component.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle including a lower reinforcement assembly for a front pillar assembly, comprising:
   a rocker outer reinforcement member extending in a vehicle lengthwise direction and including a vertically oriented face, an upper portion extending inwardly from the face in a vehicle widthwise direction and a lower portion extending inwardly from the face in the vehicle widthwise direction thereby defining a vehicle lengthwise extending cavity; and
   a front pillar lower reinforcement member connected to the rocker outer reinforcement member, the front pillar lower reinforcement member including an upwardly extending pillar portion and a lengthwise extending rocker portion having a vertically oriented face that extends downwardly terminating at the face of the outer reinforcement member at a lower edge that extends in the vehicle lengthwise direction, the front pillar lower reinforcement member including a lower wrap reinforcement structure that extends downwardly beyond the lower edge and inwardly in the vehicle widthwise direction over a corner of the rocker outer reinforcement member, the corner connecting the face of the rocker outer reinforcement member and the lower portion of the rocker outer reinforcement member.

2. The vehicle of claim 1 further comprising a rocker inner reinforcement member extending in a vehicle lengthwise direction that is received within the vehicle lengthwise extending cavity of the rocker outer reinforcement member.

3. The vehicle of claim 1, wherein the rocker portion has a total length that is greater than a length of the lower wrap reinforcement structure.

4. The vehicle of claim 1, wherein a length of the lower wrap reinforcement structure is less than about 50 percent of a total length of the rocker portion.

5. The vehicle of claim 1, wherein a length of the lower wrap reinforcement structure is no more than about 200 mm.

6. The vehicle of claim 1, wherein a length of the lower wrap reinforcement structure is between about 50 mm and about 100 mm.

7. The vehicle of claim 1, wherein the front pillar lower reinforcement member is connected to a side body outer panel.

8. The vehicle of claim 1, wherein the lower wrap reinforcement structure is integrally formed with the rocker portion of the front pillar lower reinforcement member.

9. A front pillar lower reinforcement member comprising:
   a pillar portion and a rocker portion having a face that terminates at a lower edge extending along a length of the rocker portion; and
   a lower wrap reinforcement structure having a downwardly extending portion that is arranged and configured to extend outwardly beyond the lower edge along a face of a rocker outer reinforcement member and an inwardly extending portion that is arranged and configured to extend over a corner that connects the face of the rocker outer reinforcement member and an inwardly extending lower portion of the rocker outer reinforcement member.

10. The front pillar lower reinforcement member of claim 9, wherein the rocker portion includes an upper portion, opposite the lower ledge that extends inwardly from the face of the rocker portion.

11. The front pillar lower reinforcement member of claim 9, wherein the downwardly extending portion and the inwardly extending portion are connected by a corner.

12. The front pillar lower reinforcement member of claim 9, wherein the rocker portion has a total length that is greater than a length of the lower wrap reinforcement structure.

13. A lower reinforcement assembly for a front pillar assembly of a vehicle, the lower reinforcement assembly comprising:
   a rocker outer reinforcement member extending in a vehicle lengthwise direction and including a vertically oriented face, an upper portion extending inwardly from the face in a vehicle widthwise direction and a lower portion extending inwardly from the face in the vehicle widthwise direction thereby defining a vehicle lengthwise extending cavity; and
   a front pillar lower reinforcement member comprising:
      an upwardly extending pillar portion and a lengthwise extending rocker portion having a face that terminates at a lower edge extending along a length of the rocker portion; and
      a lower wrap reinforcement structure having a downwardly extending portion that extends downwardly beyond the lower edge along a face of the rocker outer reinforcement member and an inwardly extending portion that extends along the lower portion of the rocker outer reinforcement member at an angle to the downwardly extending portion.

14. The lower reinforcement assembly of claim 13, wherein the angle between the downwardly extending portion and the inwardly extending portion of the lower wrap reinforcement structure is between about 90 degrees and about 170 degrees.

15. The lower reinforcement assembly of claim 13, wherein the rocker portion has a total length that is greater than a length of the lower wrap reinforcement structure.

16. The lower reinforcement assembly of claim 13, wherein the downwardly extending portion is connected to the rocker outer reinforcement member by one or more welds and the inwardly extending portion is connected to the lower portion of the rocker outer reinforcement member by one or more welds.

17. The lower reinforcement assembly of claim 13, wherein one or both of the downwardly extending portion and the inwardly extending portion are connected to the rocker outer reinforcement member.

18. The lower reinforcement assembly of claim 13, wherein one or both of the downwardly extending portion and the inwardly extending portion are connected to the rocker outer reinforcement member by a weld.

19. The lower reinforcement assembly of claim 13, wherein one or both of the downwardly extending portion and the inwardly extending portion are connected to the rocker outer reinforcement member by at least two welds.

20. The lower reinforcement assembly of claim 13, wherein the inwardly extending portion is connected to the rocker outer reinforcement member by at least two welds.

* * * * *